US012367752B2

(12) United States Patent
Adler Fonseca D'almeida et al.

(10) Patent No.: US 12,367,752 B2
(45) Date of Patent: Jul. 22, 2025

(54) METHOD FOR OPERATING AND RUNNING A SYSTEM FOR MOUNTING AND CONTROLLING ACCUMULATORS IN WORKSTATIONS

(71) Applicant: ACUMULADORES MOURA S/A, Belo Jardim (BR)

(72) Inventors: Dean Adler Fonseca D'almeida, Cabedelo (BR); Marcus Aurelius Barros De Oliveira, Belo Jardim (BR); Felipe Macedo Rocha, João Pessoa (BR); Tiago Emerson Teixeira De Araújo, Campina Grande (BR); Marcos Roberto Rodrigues Malveira, Recife (BR); Vinicius Vannucchi Pierre, Recife (BR); Rafael Nunes De Lima, Paulista (BR); Joao Paulo Fernandes Barbosa, Recife (BR); Henrique Figueroa Lacerda, Recife (BR); João Gabriel Machado Da Silva, Vitória de Santo Antão (BR); Spartacus Pereira Pedrosa, Belo Jardim (BR); Washington De Araújo Silva Júnior, Recife (BR); Antonio Gomes Pereira Júnior, Caruaru (BR)

(73) Assignee: ACUMULADORES MOURA S/A, Belo Jardim-Pe (BR)

( * ) Notice: Subject to any disclaimer, the term of this patent is extended or adjusted under 35 U.S.C. 154(b) by 262 days.

(21) Appl. No.: 17/918,403

(22) PCT Filed: Apr. 14, 2021

(86) PCT No.: PCT/BR2021/050154

§ 371 (c)(1),
(2) Date: Oct. 12, 2022

(87) PCT Pub. No.: WO2021/207815

PCT Pub. Date: Oct. 21, 2021

(65) Prior Publication Data

US 2023/0143698 A1 May 11, 2023

(30) Foreign Application Priority Data

Apr. 15, 2020 (BR) ......................... 102020007528-4

(51) Int. Cl.

*G08B 21/18* (2006.01)
*E05B 49/00* (2006.01)
*G08B 3/10* (2006.01)

(52) U.S. Cl.

CPC .............. *G08B 21/18* (2013.01); *E05B 49/00* (2013.01); *G08B 3/10* (2013.01)

(58) Field of Classification Search

CPC ............ G08B 21/18; G08B 3/10; E05B 49/00
See application file for complete search history.

(56) References Cited

U.S. PATENT DOCUMENTS 4,021,796 A * 5/1977 Fawcett, Jr. ......... G08B 25/008 340/529
5,392,025 A * 2/1995 Figh ....................... G08B 13/14 70/264

(Continued)

FOREIGN PATENT DOCUMENTS

BR PI1103423 3/2014
CN 203005128 6/2013

(Continued)

OTHER PUBLICATIONS

International Search Report dated Jul. 9, 2021 in International Application No. PCT/BR2021/050154.

(Continued)

*Primary Examiner* — Steven Lim
*Assistant Examiner* — Son M Tang
(74) *Attorney, Agent, or Firm* — B. Aaron Schulman, Esq.; Stites & Harbison, PLLC

(57) ABSTRACT

Operation and functioning method of an assembly and control system for accumulators in workstations, using a radio-base station rack, comprising processing center provided, at least with a battery presence sensor, at least a radio-base station rack door opening and closing sensor and an audible alarm device, allowed for use in equipment containing locks, both electromechanical and electromagnetic, and comprising the startup, verification, work and maintenance steps of an assembly and control system operation and functioning of accumulators in workstations.

19 Claims, 2 Drawing Sheets

(56) References Cited

U.S. PATENT DOCUMENTS 5,572,192 A * 11/1996 Berube ................ G08B 25/009 340/539.11
5,610,596 A * 3/1997 Petitclerc ............... G21C 17/00 701/99
6,124,797 A * 9/2000 Mercado ............ G01R 31/3648 340/636.15
7,395,053 B1 * 7/2008 Mak ........................ H04M 3/53 709/204
7,626,508 B2 * 12/2009 Kosuge .................. G08B 21/20 340/612
8,055,933 B2 * 11/2011 Jaehde ................ G06F 11/2046 714/4.11
8,922,379 B1 * 12/2014 Meyer .................... G08B 25/14 340/521
9,734,645 B2 * 8/2017 Farber ................... E05F 15/668
9,852,558 B2 * 12/2017 Cho ......................... G07C 9/30
10,062,233 B1 * 8/2018 Rogers ..................... G07C 9/38
10,432,472 B1 * 10/2019 Douberley .......... H04L 41/0686
10,720,034 B2 * 7/2020 Bergqvist ........... G08B 21/0213
11,022,652 B2 * 6/2021 Kutkut ................. G01R 31/389
11,101,517 B2 * 8/2021 Hummer ............. H01M 50/209
11,617,436 B1 * 4/2023 McNannay ........... A61J 7/0418 109/44
2003/0101373 A1 * 5/2003 Freyman ............ H04Q 11/0471 714/14
2006/0089541 A1 * 4/2006 Braun .................... G16H 40/67 128/920
2006/0223495 A1 * 10/2006 Cassett ................. H04L 67/306 455/405
2007/0229029 A1 * 10/2007 Huang .................. H02J 7/0047 320/115
2009/0051556 A1 * 2/2009 McCain ............. H04Q 11/0067 340/636.1
2009/0052889 A1 * 2/2009 McKelvey ............ H04J 3/1694 398/1
2010/0228854 A1 * 9/2010 Morrison .............. H04L 67/125 715/764
2010/0279166 A1 * 11/2010 Tseng .................... H01M 10/42 429/123
2011/0080048 A1 * 4/2011 Lin ......................... H02J 7/007 307/70
2013/0076147 A1 * 3/2013 Sun ........................... H02J 7/34 307/80
2013/0083664 A1 * 4/2013 Harris ..................... H04L 43/00 370/241
2013/0229263 A1 * 9/2013 Graczyk ................ G08C 23/04 340/10.1
2013/0257464 A1 * 10/2013 Takatsuji ................ B60L 53/51 324/705
2014/0222378 A1 * 8/2014 Piety .................. G05B 23/0283 702/183
2014/0229398 A1 * 8/2014 Conrardy ............... G06Q 30/00 705/330
2016/0043814 A1 * 2/2016 Bishop .................... H04L 43/06 370/242
2016/0099598 A1 * 4/2016 Gray .................. G01R 31/3648 307/66
2016/0149200 A1 * 5/2016 Verdu ................... H01M 50/00 429/96
2017/0143145 A1 * 5/2017 Peynet ............... G06Q 10/0836
2017/0195130 A1 * 7/2017 Landow ................. G05B 15/02
2018/0034036 A1 * 2/2018 Perry .................. H01M 50/576
2018/0175349 A1 * 6/2018 Hummer ............... F16B 41/002
2018/0223764 A1 * 8/2018 Marrack ............. F02D 41/3082
2019/0035237 A1 * 1/2019 Karner ................. G01R 31/396
2019/0141295 A1 * 5/2019 Lazar ...................... H04N 7/183
2020/0014889 A1 * 1/2020 Bashkin ............. G07C 9/00563
2020/0036056 A1 * 1/2020 Thomas ............ H01M 10/4257
2020/0272950 A1 * 8/2020 Xu ..................... G06Q 30/0185
2021/0364577 A1 * 11/2021 Kammela .............. G01R 31/62
2023/0134890 A1 * 5/2023 Adler Fonseca D'Almeida ......... E05B 47/0001 361/807
2023/0143698 A1 * 5/2023 Adler Fonseca D'Almeida ......... E05B 49/00 340/636.15
2023/0144695 A1 * 5/2023 Adler Fonseca D'Almeida ......... H01M 50/204 211/4
2023/0258726 A1 * 8/2023 Kessels ................ H05B 1/0236 324/426

FOREIGN PATENT DOCUMENTS

CN 205068141 3/2016
CN 110049283 * 7/2019
CN 110782617 2/2020
CN 110890493 * 3/2020

OTHER PUBLICATIONS

Written Opinion dated Jul. 9, 2021 in International Application No. PCT/BR2021/050154.

* cited by examiner

METHOD FOR OPERATING AND RUNNING A SYSTEM FOR MOUNTING AND CONTROLLING ACCUMULATORS IN WORKSTATIONS

FIELD OF APPLICATION

This invention is contained in the field of application of accumulating devices, more precisely in the field of the operation and functioning methods and processes of assembly and control systems for accumulators in workstations, more specifically in systems which can be used in equipment containing locks, both electromagnetic and electromechanical.

DESCRIPTION OF THE STATE-OF-THE-ART

The use of battery packs as a secondary power supply has a great variety of applications, from the domestic use to the most different fields in the industry. Such battery packs are the uninterrupted power supplies or UPS, commonly referred to as No-Breaks.

In the telecommunication market, one of the main challenges involving the management of Radio-Base Stations (RBSs) is the continuous thefts of the UPS system's batteries. A number of RBSs are installed in the field and/or in distant places and without continuous vigilance, making the UPSs batteries to be frequently stolen for use in vehicle audio systems, resale to other consumers or even for sales as scrap.

The telecommunication companies are estimated to suffer losses in the order of 30% of their battery farm, generating several problems, both in the purchase of new parts and work for field replacement and, in addition, the non-immediate replacement may cause failure and interruption of the RBS operation, resulting in fines and sanctions by the regulatory agencies.

In order to prevent this type of problem, there are some lines of action which can be implemented, such as, for example, inhibiting the theft by means of solutions intended to prevent or deter the removal of the battery from the RBS environment; disabling the battery operation by means of solutions to disable its operation, partially or permanently, upon the identification of a theft attempt; or, further, track the battery by means of a tracking solution, whether georeferenced of not, allowing to identify the battery location, and recover the asset and find the infringers.

Of the three solutions indicated above, the most feasible one, both economically and concerning its implementation, is to inhibit the theft, once the partial or total disabling of the battery still generates costs for replacing it, and tracking is difficult to be implemented once the recovery requires the use of police force.

The theft inhibition systems normally include the implementation of audible alarms in the RBSs. However, such solution is poorly efficient, because many RBSs are installed in distant places, making the access difficult and the alarm to be inefficient.

In order to prevent the battery from being stolen, ways to mechanically fix the battery into the RBS' locker or cabinet are normally used, whether by using resins or locking mechanisms.

The use of resins to fix the battery into the cabinet make it difficult or even prevents its replacement if needed, and, thus, it's a difficult to implement solution and hardly used.

The use of mechanical locks is efficient, but it causes some difficulties in case the battery requires replacement, because for the mechanical fixation is efficient, it cannot be exposed, so as to prevent violation by an infringer. Thus, the mechanical locks positioning and assembly also make the battery removal difficult by the technician in case of maintenance.

Thus, the state-of-the-art would benefit from a solution which presented an operation and functioning method for a system which allowed the control and assembly of batteries radio-base stations racks containing locks, both electromechanical and electromagnetic, and allowed the direct communication with the radio-base stations operators' databases.

BRIEF DESCRIPTION OF THE INVENTION

This invention is intended to present the operation and functioning method of an assembly and control system for batteries in radio-base stations which can be use in equipment containing locks, both electromechanical and electromagnetic.

An objective of this invention is also to present an operation and functioning method of an assembly and control system for batteries in radio-base stations which directly communicate with the radio-base stations operators' databases.

A further objective of this invention is to present an operation and functioning method of an assembly and control system for batteries in radio-base stations which records all the maintenance requests, the conducted services, their operators, as well as failures which may exist during their operation.

Finally, another objective of this invention is to present an operation and functioning method of an assembly and control system for batteries in radio-base stations which continuously monitors the system during its working step.

BRIEF DESCRIPTION OF THE DRAWINGS

The subject matter object of this Invention will be fully clear in its technical aspects from the detailed description which will be made based on the figures listed below, in which.

DETAILED DESCRIPTION OF THE INVENTION

Figure 1A:
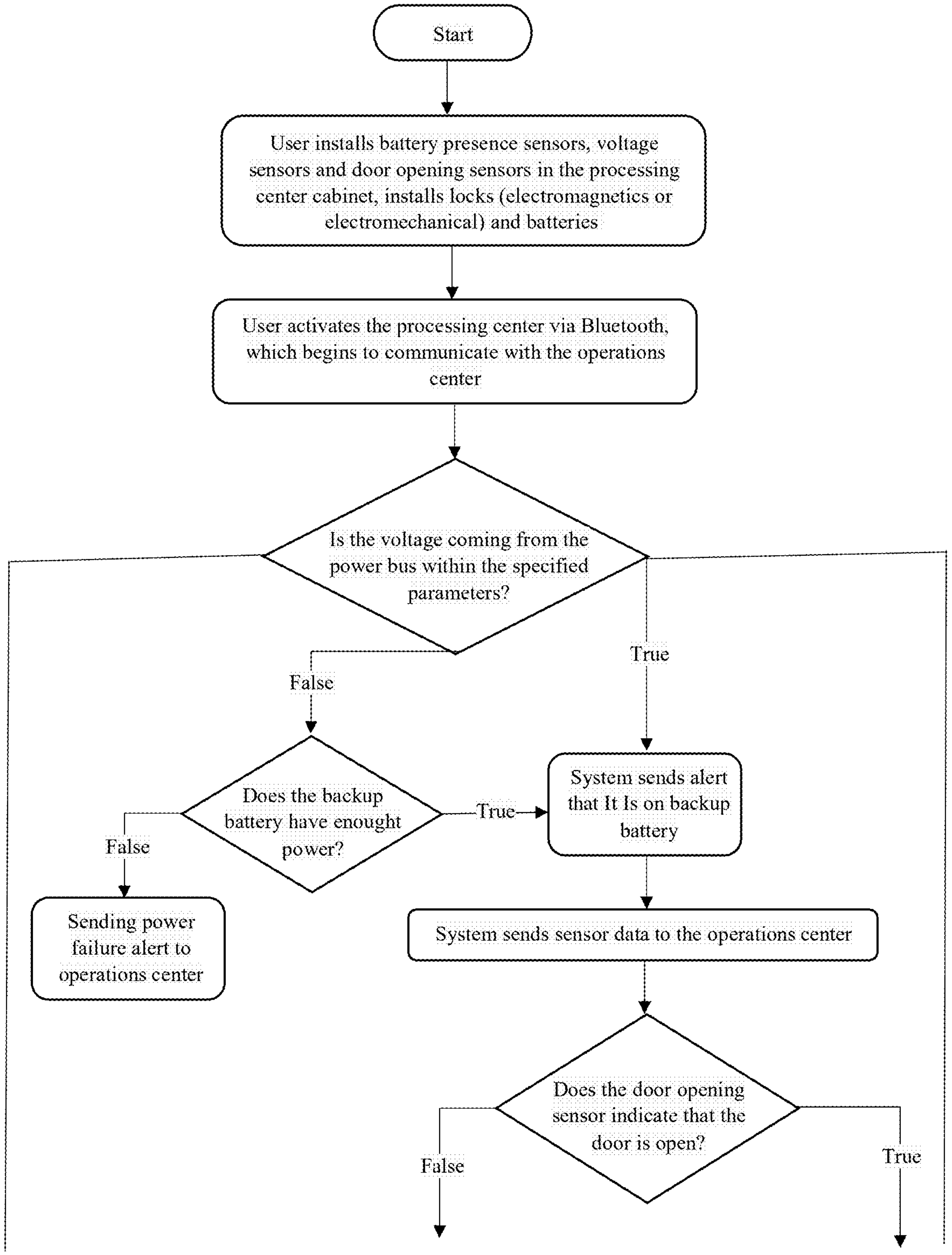
FIGS. 1A and 1B present the flowchart of the steps of the operation and functioning method of an assembly and control system for batteries in radio-base stations.
Figure 1B:
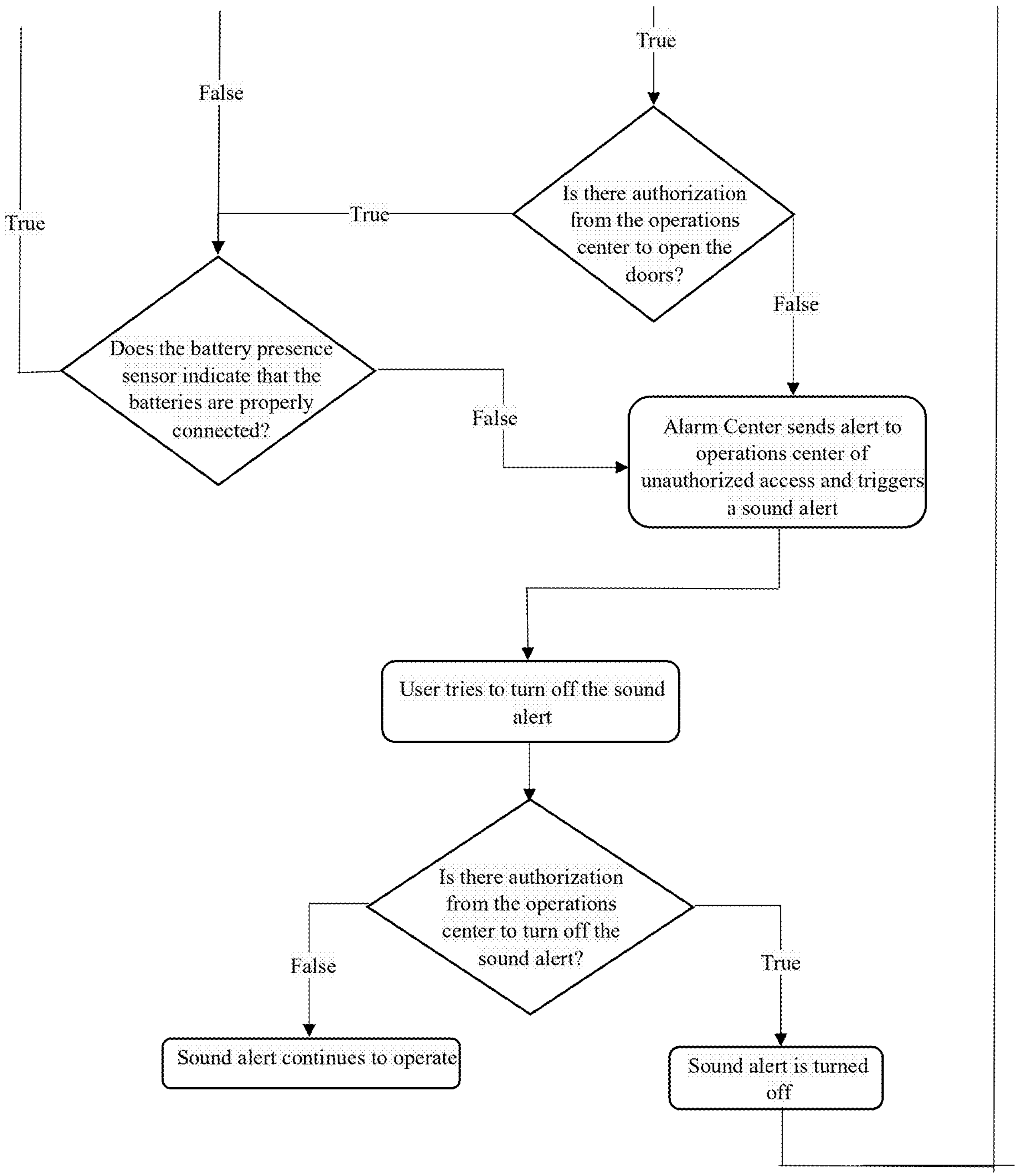

In compliance with the objective presented by means of the brief description, this patent application addresses an "OPERATION AND FUNCTIONING METHOD OF AN ASSEMBLY AND CONTROL SYSTEM FOR ACCUMULATORES IN WORKSTATIONS", which can be used in equipment containing locks, both electromechanical and electromagnetic.

The equipment containing electromechanical locks presents a locking set comprising at least one electromechanical lock and a coupling device attached to a bracket, on which the referred bracket is attached to the structure of a radio-base station cabinet or rack; a battery with at least a lock housing and an alignment element.

In its turn, the equipment containing electromagnetic locks presents batteries which receive a ferromagnetic element installed in its housing, preferably in its rear portion, to better use the space upon installation in the radio-base station, without preventing the installation of the ferromagnetic element in another portion of the referred batteries' housing and also electromagnetic locks installed in the lower portion of the radio-base station rack, preferably in its rear inner portion, being that the amount of electromagnetic locks will be the same as the quantity of batteries, once each electromagnetic lock will fix a battery. Such electromagnetic locks, when energized by means of the resulting electromagnetic field, fix the battery to the radio-base station rack, more precisely by means of the electromagnetic action in the ferromagnetic element of the battery housing.

The assembly and control system presents a processing center, common to the two types of equipment, i.e., both the equipment provided with the electromechanical lock and the equipment provide with the electromagnetic lock, being that the processing central comprises at least a battery presence sensor, at least a radio-base station rack opening and closing sensor and an audible alarm device.

The processing center is also provided with a power supply switching system, being that such power supply switching system comprises a radio-base station rack busbar voltage meter and a backup battery.

The processing center is provided with a remote communication system, preferably of bluetooth low energy type, without prejudice of using another remote communication protocol such as, for example, NFC, Wi-Fi or others, provided they allow the communication with a cellular device interconnected to the operators' databases, such interconnection being conducted by means of connection with a cloud-type system.

The initial step (a) of the system operation and functioning method is the identification of the equipment connected to the processing center, determining if that is an equipment provided with electromechanical lock or if an equipment provided with electromagnetic lock.

From such identification, the processing center sends a message to the database of the operator responsible for the radio-base station rack, as well as saving the equipment identification record in the cloud, preserving the data related to the date, time and responsible operator.

After the initial step (a), the system is started with the verification step (b), where the radio-base station rack door is closed. In this verification step, the processing center reads the door opening and closing sensor, the battery presence sensor and measures the radio-base station rack busbar voltage.

In case all the verification of the verification step (b) are correct, i.e., the battery presence sensor indicates it is in the correct position, the door opening and closing sensor indicates that the radio-base station rack door is closed and the voltage meter indicates an appropriate voltage for the system operation; the processing center will start its operation and will send a message to the database of the operator responsible for the radio-base station rack, as well as saving the equipment identification record in the cloud, preserving the data related to the date, time and operator responsible for the equipment startup.

If the measurement of the radio-base station rack busbar voltage presents a voltage value which prevents the correct operation of the electromechanical lock or the electromagnetic lock or even a voltage level which prevents the correct operation of the processing center, the switching system will switch the power supply to the backup battery and the system will start the operation and will send a message to the database of the operator responsible for the radio-base station rack, indicating operation under backup power supply, as well as saving the equipment identification record in the cloud, preserving the data related to the date, time and operator responsible for the equipment startup.

In case the radio-base station rack busbar voltage measurement sensor presents a voltage value which prevents the correct operation of the electromechanical lock or the electromagnetic lock or even a voltage level which prevents the correct operation of the processing center and the backup battery cannot provide the power supply demand of both equipment, the system will not start the operation and will send a message to the database of the operator responsible for the radio-base station rack, indicating backup power supply failure, as well as saving the equipment identification record in the cloud, preserving the data related to the date, time and operator responsible for the equipment startup attempt.

Once the equipment is started up, i.e., the verification conditions have been complied with, the work step (c) of the system operation and functioning method will start, where all the startup variable of the verification step (b) will be continuously monitored.

During the work step (c), where, as previously mentioned, all the variables are continuously verified, in case the door opening and closing sensor indicates that the door is in an open condition and the processing center has not received a maintenance or change request from the database of the operator responsible for the radio-base station rack, the audible alarm will be triggered and a violation attempt message will be sent to the database of the operator responsible for the rack, saving a failure record in the cloud, preserving the data related to date, time. The audible alarm will only be turned off when the door opening and closing sensor indicates that the door is in the closed condition and the operator's database authorizes the audible alarm to be turned off by the processing center.

Still during the work step (c), with the variables being continuously verified, in case the battery presence sensor indicates that the battery is out of position, the processing center triggers the audible alarm and sends a violation message to the database of the operator responsible for the radio-base station rack, saving a failure record in the cloud preserving the date and time data. The audible alarm will only be turned off when the battery presence sensor indicates that the battery is in the correct position and the operator's database authorizes the audible alarm to be turned off by means of a request to turn the audible alarm off by the processing center.

During the work step (c), in case the busbar voltage measurement indicates a voltage level insufficient to supply the electromechanical lock or the electromagnetic lock, or even if it's not sufficient for the processing center power supply, the switching system will switch to power supply from the backup battery and a power supply shortage message will be sent to the database of the operator responsible for the radio-base station rack, saving a failure record in the cloud preserving the date and time data.

If, perhaps, the power supply from the backup battery is insufficient to supply the electromechanical or electromagnetic locks or even to supply the processing center, the referred processing center will send a message to the database of the operator responsible for the radio-base station rack, indicating a power supply failure, saving a failure record in the cloud preserving the date and time data.

The system's operation and functioning method further present a maintenance step (d), where the work step (c) is interrupted and the verifications conducted during the work step (c) are suspended. Such maintenance step (d) will start from the receipt, by the processing center, of a maintenance request from the database of the operator responsible for the radio-base station rack.

Such maintenance step (d) is intended to allow authorized people to conduct maintenance services or replacement of parts, batteries, sensors, etc., in the radio-base station rack, without receiving any failure message by the processing center. The processing center will send a message to the database of the radio-base station operator indicating the start and end date of the maintenance, as well as the start and end time of the maintenance, the geographic location and the individual responsible for the referred maintenance in the field.

The maintenance step (d) will be completed when the operator [sic] the startup steps (a) and the verification step (b) of the concerned process.

The great advantage of the operation and functioning method of the assembly system and accumulators in workstations is that this is a simple to execute procedure, in addition to allowing its use both with electromechanical locking and electromagnetic locking equipment.

It should be understood that this description does not limit the implementation to the details described herein and that the invention is capable of other modalities and to be practiced or executed in a variety of modes, within the scope of the claims. Although specific terms have been used, such terms must be construed on a generic and descriptive sense, and not with a limiting purpose.

The invention claimed is:

1. An operation and functioning method of an assembly and control system for accumulators in workstations using a radio-base station rack, said workstations also comprising a processing center, at least one battery presence sensor, at least one radio-base station rack door opening and closing sensor and an audible alarm that can be used in equipment containing locks, both electromechanical and electromagnetic, said method comprising the following steps:

- startup step (a) where identification of equipment connected to the processing center occurs, determining if that is an equipment provided with electromechanical lock or an equipment provided with electromagnetic lock;
- verification step (b), after the startup step (a), the radio-base station rack door is closed;
- work step (c), where all system variables are continuously verified; and
- maintenance step (d), where the work step is interrupted and the system variables are no longer continuously verified;
- wherein in step (b), the processing center reads the door opening and closing sensor, the at least one battery presence sensor and measures busbar voltage of the radio-base station rack.

2. The method according to claim 1, wherein in step (a) the processing center sends a message to a database of an operator responsible for the radio-base station rack, indicating what type of locking equipment was identified, as well as saving an equipment identification record in a cloud, preserving data related to date, time and responsible operator.

3. The method according to claim 1, wherein in case all verifications of the verification step (b) are correct, so that the battery presence indicates that it is in correct position, the door opening and closing sensor indicates that the radio-base station rack door is closed and a voltage meter indicates an appropriate voltage for the system operation; the processing center will start its operation and will send a message to a database of an operator responsible for the radio-base station rack, as well as saving an equipment identification record in a cloud, preserving data related to date, time and operator responsible for equipment startup.

4. The method according to claim 1, wherein if measurement of radio-base station rack busbar voltage presents a voltage value which prevents correct operation of the electromechanical lock or the electromagnetic lock or a voltage value which prevents correct operation of the processing center, a switching system will switch a power supply to a backup battery and the switching system will start operation and will send a message to a database of an operator responsible for the radio-base station rack, indicating operation under backup power supply, as well as saving an equipment identification record in a cloud, preserving data related to date, time and operator responsible for equipment startup.

5. The method according to claim 1, wherein if a radio-base station rack busbar voltage measurement sensor presents a voltage value which prevents correct operation of the electromechanical lock or the electromagnetic lock or a voltage value which prevents correct operation of the processing center and a backup battery cannot provide a power supply demand of both equipment, a system will not start operation and will send a message to a database of an operator responsible for the radio-base station rack, indicating backup power supply failure, as well as saving an equipment identification record in a cloud, preserving data related to date, time and operator responsible for the equipment startup attempt.

6. The method according to claim 1, wherein the work step (c) will start if the verification step (b) indicates that all verification conditions have been complied with.

7. The method according to claim 1, wherein during the work step (c), in case the door opening and closing sensor indicates that the door is in an open condition and the processing center has not received a maintenance request from the database of the operator responsible for the radio-base station rack, the audible alarm will be triggered and a violation attempt message will be sent to a database of an operator responsible for the radio-base station rack, saving a failure record in a cloud, preserving data related to date, time.

8. The method according to claim 7, wherein the audible alarm will only be turned off when the door opening and closing sensor indicates that the door is in closed condition and an operator's database authorizes the audible alarm to be turned off by the processing center.

9. The method according to claim 1, wherein during the work step (c), in case the battery presence sensor indicates that the battery is out of position, the processing center triggers the audible alarm and sends a violation message to a database of the operator responsible for the radio-base station rack, saving a failure record in a cloud preserving date and time data.

10. The method according to claim 9, wherein the audible alarm will only be turned off when the battery presence sensor indicates that the battery is in correct position and an operator's database authorizes the audible alarm to be turned off by the processing center.

11. The method according to claim 1, wherein during the work step (c), in case busbar voltage measurement indicates a voltage level insufficient to supply the electromechanical lock or the electromagnetic lock, or even if it's not sufficient for the processing center power supply, a switching system will switch to power supply from a backup battery and a power supply shortage message will be sent to a database of an operator responsible for the radio-base station rack, saving a failure record in a cloud preserving date and time data.

12. The method according to claim 11, wherein if the power supply from the backup battery is insufficient to supply the electromechanical or electromagnetic locks or even to supply the processing center, the referred processing center will send a message to the database of the operator responsible for the radio-base station rack, indicating existence of a power supply failure, saving a failure record in the cloud preserving the date and time data.

13. The method according to claim 1, wherein the maintenance step (d) will start from receipt, by the processing center, of a maintenance request from a database of an operator responsible for the radio-base station rack.

14. The method according to claim 13, wherein during the maintenance step (d), the processing center will send a message to the database of the radio-base station operator indicating start and end date of the maintenance, as well as start and end time of the maintenance, a geographic location and an individual responsible for the referred maintenance in a field.

15. The method according to claim 13, wherein the maintenance step (d) will be closed when the operator conducts the startup (a) steps and the verification step (b).

16. The method according to claim 1 wherein the workstations further comprise a cabinet with a door opening and closing sensor, and voltage and current sensors integrated into the cabinet's power buses.

17. The method according to claim 1 wherein if all the verifications in the verification step b) are correct, a system will analyze the battery presence sensors to determine whether it is in contact with the electromechanical or electromagnetic locks.

18. An operation and functioning method of an assembly and control system for accumulators in workstations using a radio-base station rack, said workstations also comprising a processing center, at least one battery presence sensor, at least one radio-base station rack door opening and closing sensor and an audible alarm device that can be used in equipment containing locks, both electromechanical and electromagnetic, said method comprising the following steps:

startup step (a) where identification of equipment connected to the processing center occurs, determining if that is an equipment provided with electromechanical lock or an equipment provided with electromagnetic lock;

verification step (b), after the startup step (a), the radio-base station rack door is closed;

work step (c), where all system variables are continuously verified; and maintenance step (d), where the work step is interrupted and the system variables are no longer continuously verified;

wherein in step (b), the processing center reads the door opening and closing sensor, the at least one battery presence sensor and measures busbar voltage of the radio-base station rack; and wherein in case all verifications of the verification step (b) are correct, so that the battery presence indicates that it is in correct position, the door opening and closing sensor indicates that the radio-base station rack door is closed and a voltage meter indicates an appropriate voltage for the system operation; the processing center will start its operation and will send a message to a database of an operator responsible for the radio-base station rack, as well as saving an equipment identification record in a cloud, preserving data related to date, time and operator responsible for equipment startup.

19. An operation and functioning method of an assembly and control system for accumulators in workstations using a radio-base station rack, said workstations also comprising a processing center, at least one battery presence sensor, at least one radio-base station rack door opening and closing sensor and an audible alarm that can be used in equipment containing locks, both electromechanical and electromagnetic, said method comprising the following steps:

startup step (a) where identification of equipment connected to the processing center occurs, determining if that is an equipment provided with electromechanical lock or an equipment provided with electromagnetic lock;

verification step (b), after the startup step (a), the radio-base station rack door is closed;

work step (c), where all system variables are continuously verified; and maintenance step (d), where the work step is interrupted and the system variables are no longer continuously verified;

wherein in step (b), the processing center reads the door opening and closing sensor, the at least one battery presence sensor and measures busbar voltage of the radio-base station rack; and wherein during the work step (c), in case the door opening and closing sensor indicates that the door is in an open condition and the processing center has not received a maintenance request from the database of the operator responsible for the radio-base station rack, the audible alarm will be triggered and a violation attempt message will be sent to a database of an operator responsible for the radio-base station rack, saving a failure record in a cloud, preserving data related to date, time.

* * * * *